Nov. 27, 1951 — E. C. LEHNER — 2,576,842

METHOD OF MAKING VARIEGATED ICE CREAM

Filed Nov. 12, 1949 — 2 SHEETS—SHEET 1

INVENTOR.
Edwin C. Lehner
BY
R. G. Story
ATTORNEY

Nov. 27, 1951　　　　　E. C. LEHNER　　　　　2,576,842
METHOD OF MAKING VARIEGATED ICE CREAM
Filed Nov. 12, 1949　　　　　　　　　　　　　2 SHEETS—SHEET 2

INVENTOR.
Edwin C. Lehner
BY
ATTORNEY

Patented Nov. 27, 1951

2,576,842

UNITED STATES PATENT OFFICE 2,576,842

METHOD OF MAKING VARIEGATED ICE CREAM

Edwin C. Lehner, Chicago, Ill., assignor to Swift & Company, Chicago, Ill., a corporation of Illinois Application November 12, 1949, Serial No. 126,797

10 Claims. (Cl. 99—136)

This invention relates generally to a continuous method of preparing a frozen comestible containing a solid flavoring ingredient, and more particularly to a continuous method of preparing a frozen confection, such as ice cream, wherein discrete particles of solid flavoring material are uniformly distributed throughout the frozen product.

Heretofore in commercial practice the only practical method of preparing a product of the type referred to herein, such as chocolate chip ice cream, has been by the open or batch type freezer wherein molten chocolate is poured into the batch freezer at the end of a freezing cycle and the chocolate is thereupon dispersed throughout the frozen ice cream. The batch method of preparing chocolate chip ice cream, however, is a relatively slow and expensive operation which has resulted in the rather limited production of chocolate chip ice cream.

It has long been the desire of ice cream manufacturers to produce an ice cream having finely divided discrete particles of solidified flavoring material distributed uniformly throughout the mass of ice cream by means of a continuous process, while at the same time maintaining the desired body and texture of the ice cream. Some manufacturers have attempted to solve the problem of making a product such as chocolate chip ice cream by preparing small chocolate "flakes" to be added to the ice cream subsequent to the freezing thereof, either through the fruit feeder or in a separate mixer employed after the ice cream has been extruded from the continuous freezer. In every instance, however, the preformed chocolate particles either could not be effectively added without clogging the feeding apparatus or were incapable of being properly distributed throughout the ice cream without rendering the body and texture of the ice cream objectionable. Other manufacturers have attempted to introduce a stream of molten chocolate into the frozen ice cream after discharge from the freezer by means of special apparatus which breaks the stream of solidified chocolate into small particles and mixes the said particles with the ice cream. The latter method, however, is undesirable, since agitation sufficient to distribute the chocolate particles uniformly causes an increase in the temperature of the ice cream which is detrimental to the body and texture and the quality of the finished ice cream.

It is an object of this invention, therefore, to provide a commercial method of continuously producing a frozen confection containing a finely divided solidified flavoring material.

Another object of this invention is to provide an improved method of forming uniformly subdivided particles of a solid flavoring material throughout a frozen confection.

Still another object of this invention is to provide an improved method of simultaneously subdividing and uniformly dispersing particles of solidified flavoring material throughout a frozen confection product, such as ice cream, during the freezing cycle.

Another object of the invention is to provide an improved method of simultaneously subdividing and uniformly dispersing particles of solidified flavoring material throughout a frozen confection product, such as ice cream, without impairing the texture and quality of said product.

An additional object of this invention is to provide a continuous method of forming small particles of chocolate and dispersing said particles uniformly throughout an ice cream without requiring the use of special particle-forming or mixing equipment.

Still another object of this invention is to provide a more economical method of producing chocolate chip ice cream.

Other objects of this invention will be apparent from the description and claims to follow.

In achieving the foregoing and other objects of this invention, details in the methods have been provided as illustrated in the accompanying drawings, wherein.

Figure 1:
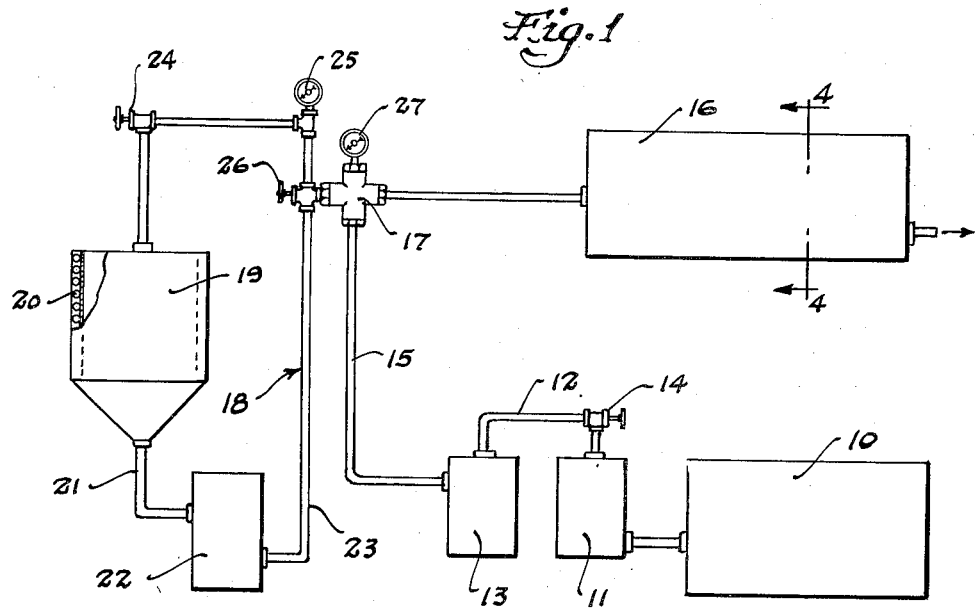
Figure 1 is a diagrammatic view of suitable apparatus arranged for introducing molten flavoring material into an ice cream mix prior to the entry thereof into the freezing cylinder of a continuous freezer, and showing the flow of the material through the continuous freezer apparatus.

Referring more particularly to Figure 1 of the drawings, the unfrozen comestible mix is pumped from a mix supply tank 10 where it is preferably cooled and is then introduced into a first-stage mix pump 11 which forces the comestible mix through a conduit 12 into a second-stage air pump 13. Pump 13 operates at a higher speed than the first-stage mix pump 11 in order to draw the desired amount of air through an adjustable valve 14 in conduit 12. The comestible mix is incorporated with the desired amount of air to form an air-mix mixture or "foam" which is then forced through the mix conduit or feed line 15 into the freezing cylinder 16. The mix conduit 15 is provided with a suitable cross-fitting 17 before entering the freezer so that one side thereof may be connected with suitable flavoring material injecting apparatus 18.

The flavoring material injecting apparatus 18 is comprised of a suitable flavoring material reservoir 19 with a suitable heating means such as heating coil 20 to maintain the flavoring material in a molten condition, and is provided with a suitable flavoring material conduit 21 leading to a positive action sanitary pump 22 which forces the molten flavoring material through the conduit 23 connected with the cross-fitting 17 in conduit 15 through control valve 26. The return side of said conduit 23 is provided with a pressure gauge 25 and a back-pressure regulating valve 24 in order to regulate the pressure of the flavoring material therein. The flavoring material control valve 26 in conduit 23 is connected with the "cross" 17 in conduit 15 in order to regulate the flow of material into the comestible mix feed line 15. When the pressure in the flavoring material injecting system is properly adjusted by regulating the valve 24 and pump 22, the control valve 26 is opened to permit the desired amount of flavoring material to enter the cross-fitting 17 where it solidifies immediately in the form of small irregular globules when it contacts the chilled ice cream mix or "foam." The flavoring particles are then carried with the "foam" into the ice cream freezer 16 where they are rapidly subdivided by the mutator and blades attached thereto into uniformly small particles and simultaneously distributed evenly throughout the ice cream.

Figure 2:
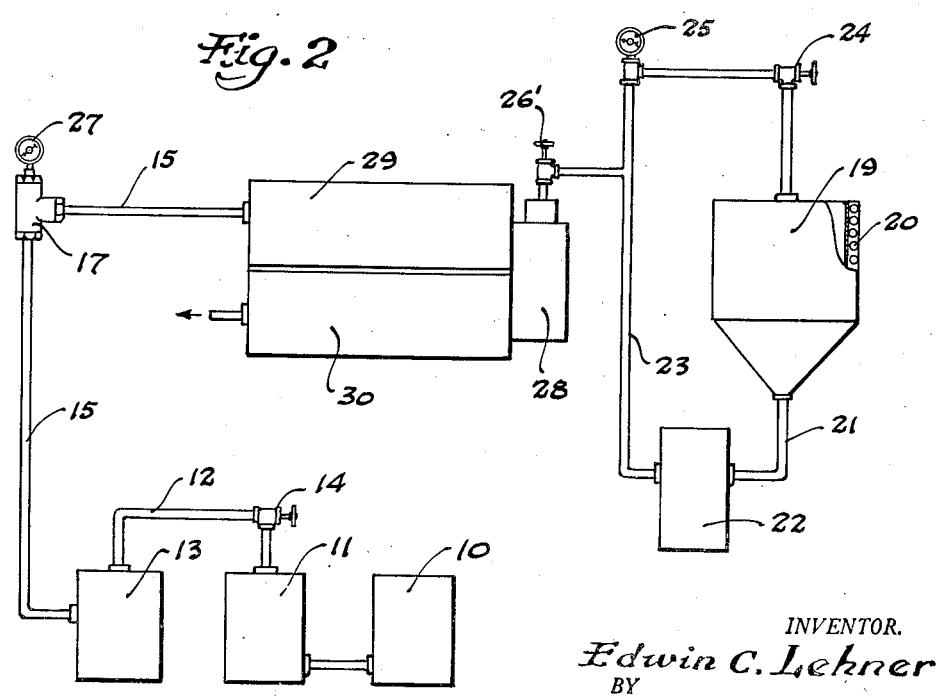
Figure 2 is a diagrammatic view of a two-cylinder continuous freezer and auxiliary apparatus showing an arrangement whereby molten chocolate is introduced into an ice cream mix after it has been partially frozen in the first cylinder of the freezer and before it enters the second cylinder of the freezer.

The modified form of the invention as shown in Figure 2 of the drawings employs identical flavoring material injecting apparatus and mixture forming apparatus comprised of two positive action pumps as illustrated in Figure 1 of the drawings but differs from the method disclosed in Figure 1 in that the flavoring material is injected into the transfer case 28 which connects the first freezer cylinder 29 with the second freezer cylinder 30 of a two-cylinder continuous mechanical freezer. In the latter form of the invention, after the pressure in the flavoring material injecting apparatus, as indicated by gauge 25, is adjusted so that the pressure is in excess of that in the freezer, the flavoring material control valve 26' is opened to permit the desired amount to enter through transfer case 28 and carried into freezer cylinder 30. As in the previous form of the invention, the molten flavoring material imediately solidifies in the form of irregular shaped globules upon contact with the partially frozen comestible mix, and the iregularly shaped solid particles of flavoring material are then carried by the mix into the second stage of the continuous freezer where the particles are rapidly subdivided into uniformly small fragments of flavoring material by the rotating mutator blades. The frozen comestible discharged from the continuous freezer contains the small particles of flavoring material uniformly distributed throughout the comestible.

Figure 3:
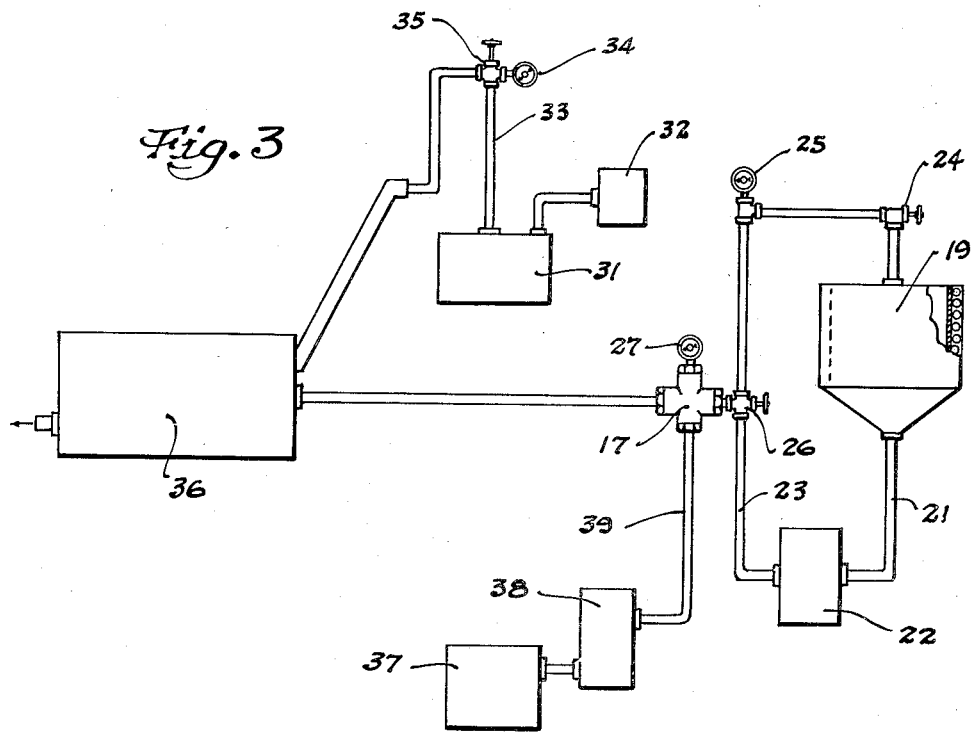
Figure 3 is a diagrammatic view of another modified form of this invention wherein the chocolate and ice cream mix are introduced into the freezing cylinder of a continuous freezer separately from the supply of air.

In the form of the invention shown in Figure 3 of the drawings, the flavoring material is injected into a chilled comestible mix which does not have added air mixed therewith at the time the flavoring material is introduced. The same flavoring material injecting apparatus as disclosed in Figure 1 is employed to inject the molten flavoring material into the ice cream mix. Since however, the air and other ice cream ingredients are not intermixed prior to their entry into the freezing cylinder of the continuous freezer, separate air-injecting and comestible mix-injecting apparatus are employed. In the air-injecting system an air compressor 31 draws air through filter 32 and forces said air through conduit 33 having an appropriate air pressure gauge 34 and air pressure regulator 35 disposed therein to the freezing cylinder 36 where the air is intermixed with the flavoring and ice cream ingredients. The amount of air which is added is regulated by means of air pressure regulator 35. In the mix-injecting system, the chilled mix held in a mix supply tank 37 is forced by means of pump 38 through conduit 39 which contains a suitable cross-fitting 17 between the pump 38 and freezing cylinder 36. One arm of the said "cross" 17 is connected with the flavoring material conduit 23 through a suitable flavoring material control valve 26, as in the previous forms of the invention. The operation of the latter embodiment of the invention is the same as that disclosed in Figure 1 so that the molten flavoring material solidifies immediately upon contacting the chilled ice cream mix and is carried with the mix through the freezing cylinder 36 where it is rapidly subdivided into uniformly fine particles by the mutator or dasher having blades attached thereto, and dispersed evenly throughout the ice cream.

In producing chocolate chip ice cream in accordance with the form of the invention disclosed in Figure 1 of the drawings, it has been found desirable initially to adjust the conventional continuous freezing apparatus to normal operating conditions. For example, the air-mix "foam" may be adjusted to a temperature of about 40° by controlling the temperature of the mix in the supply tank 19 and the mix pressure is adjusted to approximately 40–60 pounds per square inch. While the continuous freezer is being properly adjusted to normal operating conditions, the chocolate supply apparatus is simultaneously being regulated by adjusting pump 22 and valve 24 while valve 26 is maintained in the closed position until sufficient pressure has been built up in the chocolate injecting system to exceed the mix pressure in the continuous freezer system. When pressure gauge 25 on conduit 23 shows a pressure of about 15 pounds per square inch in excess of mix pressure, the valve 26 is opened so as to introduce an amount of molten chocolate into the supply line 16 sufficient to produce the desired concentration of chocolate in the final product. A very desirable chocolate chip ice cream is produced by introducing between 0.5 and 5.0 per cent chocolate based on the weight of the ice cream mix.

It has been found desirable to maintain the temperature of the molten chocolate in reservoir 19 at a temperature between approximately 110° and 125° F. When the molten chocolate at the said temperature is injected into the air-mix "foam" having a temperature of approximately 40° F., the chocolate is immediately solidified into irregularly shaped, relatively small globular particles which are suspended and carried by the air-mix "foam" into the continuous freezer tube or cylinder. Upon entering the continuous freezer tube the particles of solidified chocolate are immediately subjected to the shearing action of the mutator blades which revolve at relatively high speed within the freezer tube. The chocolate particles are thrown by centrifugal force against the inner wall of the freezer tube where the mutator blades shear and scrape the particles to form uniformly fine particles of chocolate. Simultaneously the fine chocolate particles are being dispersed throughout the mass of ice cream mix being frozen. When the ice cream has been sufficiently frozen and has reached the discharge end of the freezing cylinder, the irregular particles of solidified chocolate have been reduced to a uniformly small particle size and have been evenly distributed throughout the mass of ice cream.

Figure 4:
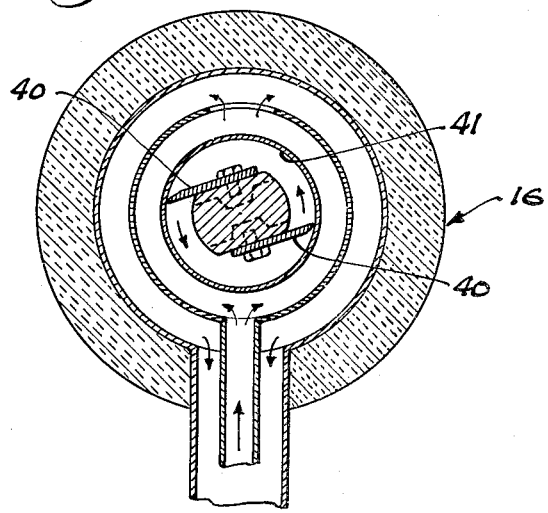
Figure 4 is a sectional view of the freezing cylinder of the continuous freezer shown in Fig. 1 of the drawings, showing the mutator positioned therein.

From the foregoing it is evident that, contrary to the general belief that the identity of a solid material would be destroyed if allowed to pass through a continuous freezer, the mutator blades of a continuous freezer may be effectively used to uniformly subdivide and disperse a solid flavoring ingredient, such as chocolate, throughout a mass of a frozen confection, such as ice cream, without destroying the identity of the said material. As shown more clearly in Figure 4, the mutator blades 40 closely contact the refrigerated surface 41 of the freezing cylinder 16. Thus, the irregular globular particles of chocolate formed when the molten chocolate is injected under substantial pressure into the chilled ice cream mix are immediately subjected to the shearing force exerted by the mutator blades 40. As the ice cream mixture containing the solid particles of flavoring material progresses through the continuous freezer, the particles are thrown in contact with the walls of the freezing cylinder and are rapidly subjected to the shearing or scraping action of the mutator blades. And, as the ice cream is transformed from the fluid state to the more viscous frozen state, the particles gradually become suspended therein and a uniform mixture of ice cream and flavoring particles is formed.

It should be observed that the practice of the present invention is not confined to a particular type of continuous mechanical freezer and may be employed with any continuous mechanical freezer having one or more mutators for agitating and scraping in the freezer tube or cylinder. Thus, for example, the present invention may be employed with any of the standard continuous mechanical freezers or other apparatus having at least one scraping and agitating means therein capable of subdividing the solid globules of flavoring material prior to discharging the mix from the final freezing zone.

The present invention makes it commercially feasible to introduce many flavoring materials including molten chocolate, chocolate liquor, or pure chocolate syrup into the inlet end of a continuous freezer, either admixed with the components of the ice cream or separately therefrom, and produces in a continuous process an improved chocolate chip ice cream which has a uniformly high quality. Since the method disclosed herein does not agitate or otherwise disturb the finished ice cream after it leaves the continuous freezer, the highly desirable body and texture of the ice cream are not destroyed. Any process of admixing a flavoring ingredient which requires agitation of the finished ice cream after the freezing process is completed has a deleterious effect upon the body and texture of the ice cream product. Thus, by completely avoiding all disturbance of the ice cream after it leaves the continuous freezer, the present invention makes it possible to produce a frozen product, such as chocolate chip ice cream, which retains all of the original fine body and texture and characteristics of vanilla ice cream while at the same time having the divided flavoring material uniformly dispersed throughout the ice cream.

While the preferred mode of introducing a solidifiable flavoring material, such as molten chocolate, into a continuous freezer is by injecting the flavoring material into a chilled comestible mix, such as ice cream mix, in the manner disclosed in the drawings, it should be understood that the solidified flavoring material may be introduced into a continuous freezer by other means. Any suitable means may be employed for introducing the flavoring material into the inlet end of a continuous freezer, provided the flavoring material is injected at a pressure in excess of that of the freezer at a point so that the flavoring material passes through a freezing cylinder and is rapidly solidified. It should, thus, be understood that elaborate apparatus is not required to inject the molten chocolate into an ice cream air-mix or other comestible mix, the apparatus shown in Figures 1, 2, and 3 being simply illustrative. For example, the molten chocolate can be introduced into the ice cream mix feed line simply by means of a positive action pump with a direct connection to the inlet line of a continuous freezer.

While the specific embodiment of the invention as disclosed herein has been concerned primarily with the preparation of chocolate chip ice cream, it should be understood that other frozen comestibles and flavoring materials may be employed in the practice of the invention. Any flavoring material which is liquefiable at a temperature above the temperature of the ice cream mix or other comestible mix and which solidifies into a deformable solid at the temperature of the chilled comestible mix or the temperature of the product in the continuous freezer may be employed in the applicant's invention. Examples of such materials which may be employed are butterscotch, a fondant-type flavoring mixture such as mints or the like, a gelatin mixture of fruit, a gelatin ground nut-meat mixture, and a candy-type flavoring mixture such as peanut brittle. Those skilled in the art will be aware of many similar flavoring materials which might be employed in the present invention.

Many other frozen comestibles in addition to ice cream may be prepared in accordance with the present invention. For example, the method disclosed herein may also be used to incorporate a solid flavoring material which retains its identity in such comestibles as sherbets, ice milks water and fruit ices, and frozen custard, or the like.

Obviously, many modifications and variations of the invention set forth herein may be made without departing from the spirit and scope thereof and, therefore, only such limitations should be imposed as are indicated in the appended claims.

I claim:

1. A continuous method of making a frozen confection containing finely divided solidified flavoring material comprising introducing a solidifiable flavoring material in a molten condition into a continuously moving stream of chilled confection mix prior to passing the said mix through a freezing zone having at least one scraping and agitating means revolving at relatively high speed therein, said flavoring material solidifying into irregularly shaped solid particles upon entering the said stream and being carried by the stream into the freezing zone, subdividing the solidified irregularly shaped solid particles into uniformly small particles of flavoring material by means of the said scraping and agitating means as the mix containing the said irregularly shaped solid particles moves through the freezing zone, discharging the said partially frozen mix containing the particles of flavoring material uniformly dispersed throughout from the freezing zone directly into suitable holding means without disturbing the normal flow of the said mix to prevent impairment of the body and texture thereof, and holding the partially frozen mix at a relatively low temperature to completely freeze the said mix.

2. A continuous method of making a frozen confection containing finely divided solidified flavoring material comprising continuously introducing a flavoring material in a molten condition into a continuously moving stream of a chilled confection mix containing added air prior to introducing the said mix into a freezing zone having at least one scraping and agitating means revolving at relatively high speed therein, said flavoring material solidifying into small irregularly shaped solid particles upon entering the stream and being carried by the said stream into the said freezing zone, subdividing the solidified irregularly shaped solid particles into uniformly small particles by means of the said scraping and agitating means as the said mix containing the irregularly shaped solid particles moves through the freezing zone, discharging the partially frozen mix containing the said particles uniformly dispersed therein from the freezing zone directly into suitable holding means without disturbing the normal flow of the said mix to prevent impairment of the body and texture thereof, and holding the said partially frozen mix at a relatively low temperature to completely freeze said mix.

3. A continuous method of making chocolate chip ice cream comprising introducing a solidifiable chocolate composition in a molten condition into a continuously moving stream of chilled ice cream mix prior to passing the mix through a freezing zone having at least one scraping and agitating means revolving at relatively high speed therein, said chocolate composition solidifying into irregularly shaped solid particles upon entering the said stream and before being carried by the stream into a freezing zone, subdividing the solidified irregularly shaped solid particles into uniformly small chips of chocolate by means of the said scraping and agitating means as the mix moves through the freezing zone, discharging the partially frozen mix containing the said chips uniformly dispersed throughout from the freezing zone directly into suitable holding means without disturbing the normal flow of said mix to prevent impairment of the body and texture of the ice cream, and holding the said mix at a relatively low temperature to complete the freezing thereof.

4. A continuous method of making chocolate chip ice cream comprising introducing a molten chocolate composition into a continuously moving stream of chilled ice cream mix containing added air prior to introducing the said mix into a freezing zone having at least one scraping and agitating means revolving at relatively high speed therein, said chocolate composition solidified into small irregularly shaped solid particles upon entering said stream and before being carried by the said mix into the said freezing zone, subdividing the solidified irregularly shaped solid particles into uniformly small chips of chocolate by means of the said scraping and agitating means as the mix moves through the freezing zone, discharging the partially frozen mix containing the said chips uniformly dispersed therein from the freezing zone directly into suitable holding means without interrupting the normal flow of said mix to prevent impairment of the body and texture thereof, and holding said partially frozen mix at a relatively low temperature to complete the freezing of said mix.

5. A method of introducing a flavoring material into a frozen confection mix comprising heating a solidifiable flavoring material above its liquefying temperature, continuously injecting the said material while in a molten state under pressure into a continuously moving stream of chilled liquid confection mix, said flavoring material solidifying in the form of irregularly shaped solid particles upon entering the said moving stream and before being carried along by the said stream into a freezing zone wherein the solidified flavoring material is simultaneously subdivided and uniformly dispersed through the said confection mix while freezing.

6. A method of introducing a flavoring material into a frozen confection mix comprising heating a solidifiable flavoring material above its liquefying temperature, continuously injecting the said material under pressure in a fine stream into a continuously moving stream of chilled confection mix prior to introducing the said mix into a freezing zone, said flavoring material solidifying in the form of irregularly shaped solid particles upon entering the said moving stream and before being carried along by the said stream into the freezing zone wherein the solidified flavoring material is simultaneously subdivided and uniformly dispersed through the said confection mix while freezing.

7. A method of introducing a chocolate flavoring material into an ice cream mix comprising heating a solidifiable chocolate flavoring material above the liquefying temperature thereof, continuously injecting the said molten chocolate under pressure into a continuously moving stream of chilled liquid ice cream mix, said molten chocolate solidifying to form irregularly shaped solid particles of chocolate upon entering the said stream and before being carried along by the said moving stream of ice cream mix into a freezing zone wherein the solidified chocolate is simultaneously subdivided and uniformly dispersed throughout the ice cream mix while the said mix is freezing.

8. A method of introducing a chocolate flavoring material into an ice cream mix comprising heating a solidifiable chocolate flavoring material to a liquefying temperature thereof, continuously injecting the said molten chocolate under pressure as a fine stream into a continuously moving stream of chilled liquid ice cream mix prior to introducing the said mix into a freezing zone, said molten chocolate solidifying to form irregularly shaped solid particles of chocolate upon entering the said stream and before being carried along by the said moving stream of ice cream mix into the freezing zone wherein the solidified chocolate is simultaneously subdivided and uniformly dispersed throughout the ice cream mix while the said mix is being frozen.

9. A continuous method of making a frozen confection containing finely divided solidified flavoring material comprising introducing a solidifiable flavoring material while in a molten state into a continuously moving stream of confection mix prior to charging the said mix into a freezing zone wherein the said flavoring material solidifies, passing the mixture of the said confection and solidified flavoring material into a freezing zone having at least one scraping and agitating means wherein the said mixture is simultaneously subdivided and the solidified flavoring material uniformly dispersed therethrough during the passage of the said mixture through the freezing zone, and discharging the partially frozen mixture containing the said subdivided flavoring material uniformly dispersed therein from the freezing zone directly into suitable holding means without disturbing the normal flow of the said mixture thereby preventing impairment of the body and texture thereof, and thereafter holding the partially frozen mixture at a relatively low temperature to completely freeze the said mixture.

10. A continuous method of making chocolate chip ice cream, comprising introducing a solidifiable chocolate composition in a molten condition into a continuously moving stream of ice cream mix prior to charging the said mix into a freezing zone whereupon the chocolate is solidified, charging the said mix containing the solidified chocolate into a freezing zone having at least one scraping and agitating means wherein the said chocolate is simultaneously subdivided and uniformly dispersed throughout the ice cream mix during the passage of the said mix through the freezing zone, discharging the partially frozen ice cream mix containing the said subdivided chocolate uniformly dispersed therethrough from the freezing zone into suitable holding means without disturbing the normal flow of the said ice cream mix thereby preventing impairment of the body and texture of the partially frozen ice cream, and then holding the said ice cream at a relatively low temperature to complete the freezing of the ice cream mix.

EDWIN C. LEHNER.

REFERENCES CITED

The following references are of record in the file of this patent:

UNITED STATES PATENTS

| Number | Name | Date |
| --- | --- | --- |
| 1,459,078 | Alexander | June 19, 1923 |
| 1,963,938 | Cover | June 19, 1934 |
| 2,313,060 | Friedman | Mar. 9, 1943 |
| 2,347,083 | Connellee et al. | Apr. 18, 1944 |